(12) United States Patent
Syoyama (10) Patent No.: US 11,345,117 B2
(45) Date of Patent: May 31, 2022

(54) METHOD FOR MANUFACTURING SHEET-SHAPED MATERIAL AND SHEET-SHAPED MATERIAL

(71) Applicant: SEIREN CO., LTD., Fukui (JP)

(72) Inventor: Jun Syoyama, Fukui (JP)

(73) Assignee: SEIREN CO., LTD.

( * ) Notice: Subject to any disclaimer, the term of this patent is extended or adjusted under 35 U.S.C. 154(b) by 0 days.

(21) Appl. No.: 16/973,854

(22) PCT Filed: May 28, 2019

(86) PCT No.: PCT/JP2019/021010
§ 371 (c)(1),
(2) Date: Dec. 10, 2020

(87) PCT Pub. No.: WO2019/244572
PCT Pub. Date: Dec. 26, 2019

(65) Prior Publication Data
US 2021/0178425 A1    Jun. 17, 2021

(30) Foreign Application Priority Data
Jun. 18, 2018 (JP) .............................. JP2018-115254

(51) Int. Cl.
*B32B 3/30* (2006.01)

(52) U.S. Cl.
CPC ......... *B32B 3/30* (2013.01); *Y10T 428/24802* (2015.01); *Y10T 428/24826* (2015.01)

(58) Field of Classification Search
CPC ............... B32B 3/30; Y10T 428/24802; Y10T 428/24826

(Continued)

(56) References Cited

U.S. PATENT DOCUMENTS

| 2001/0028974 A1 | 10/2001 | Nakata et al. |
| 2002/0090457 A1 | 7/2002 | Leonard et al. |

(Continued)

FOREIGN PATENT DOCUMENTS

| CN | 1498138 A | 5/2004 |
| CN | 1553829 A | 12/2004 |

(Continued)

OTHER PUBLICATIONS

International Search Report for Application No. PCT/JP2019/021010 dated Aug. 6, 2019, 2 pages.

*Primary Examiner* — Betelhem Shewareged
(74) *Attorney, Agent, or Firm* — Lerner, David, Littenberg, Krumholz & Mentlik, LLP (57) ABSTRACT

A method for manufacturing a flexible sheet-shaped material includes a preceding process and a succeeding process. The preceding process is a process for applying a first coating liquid to a material to be coated by a first roll coater. The material to be coated includes a convex portion and becomes the sheet-shaped material. The succeeding process is a process which is performed after the preceding process and which applies a second coating liquid to the material to be coated by a second roll coater. The preceding process is a process for applying the first coating liquid only to the convex portion using a reverse roll coater as the first roll coater. The succeeding process is a process for applying the second coating liquid only to the convex portion by the second roll coater.

1 Claim, 3 Drawing Sheets

(58) Field of Classification Search
USPC .................................................... 428/195.1
See application file for complete search history.

(56) References Cited

U.S. PATENT DOCUMENTS

| | | |
|---|---|---|
| 2002/0129766 A1 | 9/2002 | Pekurovsky et al. |
| 2004/0201660 A1 | 10/2004 | Nishikawa et al. |
| 2005/0223649 A1 | 10/2005 | O'Gary et al. |
| 2017/0342658 A1 | 11/2017 | Kawamura |
| 2021/0178425 A1* | 6/2021 | Syoyama .................. B32B 3/30 |

FOREIGN PATENT DOCUMENTS

| | | |
|---|---|---|
| CN | 1942283 A | 4/2007 |
| CN | 101844121 A | 9/2010 |
| JP | S621548 B2 | 1/1987 |
| JP | H02099673 A | 4/1990 |
| JP | H10109377 A | 4/1998 |
| JP | H10230220 A | 9/1998 |
| JP | 2003164799 A | 6/2003 |
| JP | 2004071825 A | 3/2004 |
| JP | 2015196830 A | 11/2015 |
| WO | 2016098324 A1 | 6/2016 |

* cited by examiner

METHOD FOR MANUFACTURING SHEET-SHAPED MATERIAL AND SHEET-SHAPED MATERIAL

CROSS-REFERENCE TO RELATED APPLICATIONS

This application is a national phase entry under 35 U.S.C. § 371 of International Application No. PCT/JP2019/021010 filed May 28, 2019, which claims priority from Japanese Patent Application No. 2018-115254 filed in the Japanese Patent Office on Jun. 18, 2018, the entire contents of which are hereby incorporated by reference herein.

TECHNICAL FIELD

The present invention relates to a method for manufacturing a sheet-shape material having flexibility whose convex portion is covered by a coating material which is formed by a coating liquid, and the sheet-shaped material.

BACKGROUND ART

Techniques for applying a coating liquid to a convex portion of a material to be coated have been studied. For example, Patent Document 1 discloses a coating method that emphasizes the design of an embossed pattern base material. In the coating method, a high-viscosity paint is coated on the entire embossing surface of the embossed pattern base material by a direct roll coater to form an undercoat. Then, the same high-viscosity paint is coated only to the convex portion in the embossed pattern by the direct roll coater or a reverse roll coater.

CITATION LIST

Patent Literature

Patent Document 1: Japanese Examined Patent Publication No. 62-1548

SUMMARY OF INVENTION

Problems to be Solved by the Invention

A method for manufacturing a sheet-shaped material having the following aspect and a flexibility is performed by using a sheet-shaped material to be coated which includes a convex portion and has flexibility as a base material. The previously described aspect is an aspect which the convex portion is only covered by a coating material. The coating material is formed by a coating liquid. In this manufacturing method, it may be difficult to apply the coating liquid only to the convex portion uniformly. For example, since the material to be coated has flexibility, when the method for manufacturing the sheet-shaped material is carried out, wrinkles are easily generated on the material to be coated. The inventor is aware that during the method for manufacturing the sheet-shaped material is carried out, wrinkles are easily generated on the material to be coated between a direct roll coater and a roll coater next to this direct roll coater. When wrinkles are generated on the material to be coated, it is difficult to apply the coating liquid only to the convex portion. Furthermore, in the case mentioned above, it is difficult to apply the coating liquid to the desired position of the convex portion.

An object of the present invention is to provide a method for manufacturing a sheet-shaped material having flexibility which can apply a coating liquid only to a convex portion of a material to be coated. Further, an object of the present invention is to provide a sheet-shaped material whose convex portion is only covered by a coating material.

Solutions to Problems

One aspect of the present invention is a method for manufacturing a sheet-shaped material having flexibility whose convex portion is covered by a coating material which is formed by a coating liquid, the method including: a preceding process for applying a first coating liquid as the coating liquid to a flexible material to be coated which includes the convex portion and which becomes the sheet-shaped material by performing the manufacturing method by a first roll coater, and a succeeding process for applying a second coating liquid as the coating liquid to the material to be coated by a second roll coater and which is performed after the preceding process, wherein the preceding process is a process for applying the first coating liquid only to the convex portion by using a reverse roll coater as the first roll coater, wherein the succeeding process is a process for applying the second coating liquid only to the convex portion by the second roll coater.

In the method for manufacturing the sheet-shaped material, the succeeding process may include a process for applying the second coating liquid only to the convex portion by using a direct roll coater as the second roll coater.

In the method for manufacturing the sheet-shaped material, the succeeding process may include a process for applying the second coating liquid only to the convex portion by wet-on-wet.

Another aspect of the present invention is a sheet-shaped material including: a material to be coated having flexibility and includes a convex portion, and a coating material which covers only the convex portion.

In the sheet-shaped material, the coating material may cover a side surface of the convex portion.

Advantageous Effects of the Invention

According to the present invention, a method for manufacturing a sheet-shaped material having flexibility which can apply a coating liquid only to a convex portion of a material to be coated can be obtained. Further, according to the present invention, a sheet-shaped material whose convex portion is only covered by a coating material can be obtained.

DESCRIPTION OF EMBODIMENTS

Embodiments for carrying out the present invention will be described with reference to the drawings. The present invention is not limited to the configurations described below, and various configurations can be employed based on the same technical idea. For example, a part of the configurations shown below may be omitted or may be replaced by another configuration or the like. Other configurations may be included. Each drawing of the embodiment schematically shows a predetermined configuration. Therefore, in each drawing of the embodiment, correspondence with another drawing or correspondence with a numerical value which will be described later specifying the configuration in the drawing may not be accurate in some cases. In each drawing of the embodiment, hatching indicates a cross-section.

<Sheet-Shaped Material, Method for Manufacturing Sheet-Shaped Material and Coating Machine>

A sheet-shaped material 60, a method for manufacturing the sheet-shaped material 60 and a coating machine 5 will be described with reference to FIGS. 1 and 2. In the embodiment, the sheet-shaped material 60 means a product which is manufactured by the "method for manufacturing the sheet-shaped material 60". The method for manufacturing the sheet-shaped material 60 is simply described as "manufacturing method". In FIG. 2, illustrations of the sheet-shaped material 60 and a material to be coated 61 are simplified.

Figure 1:
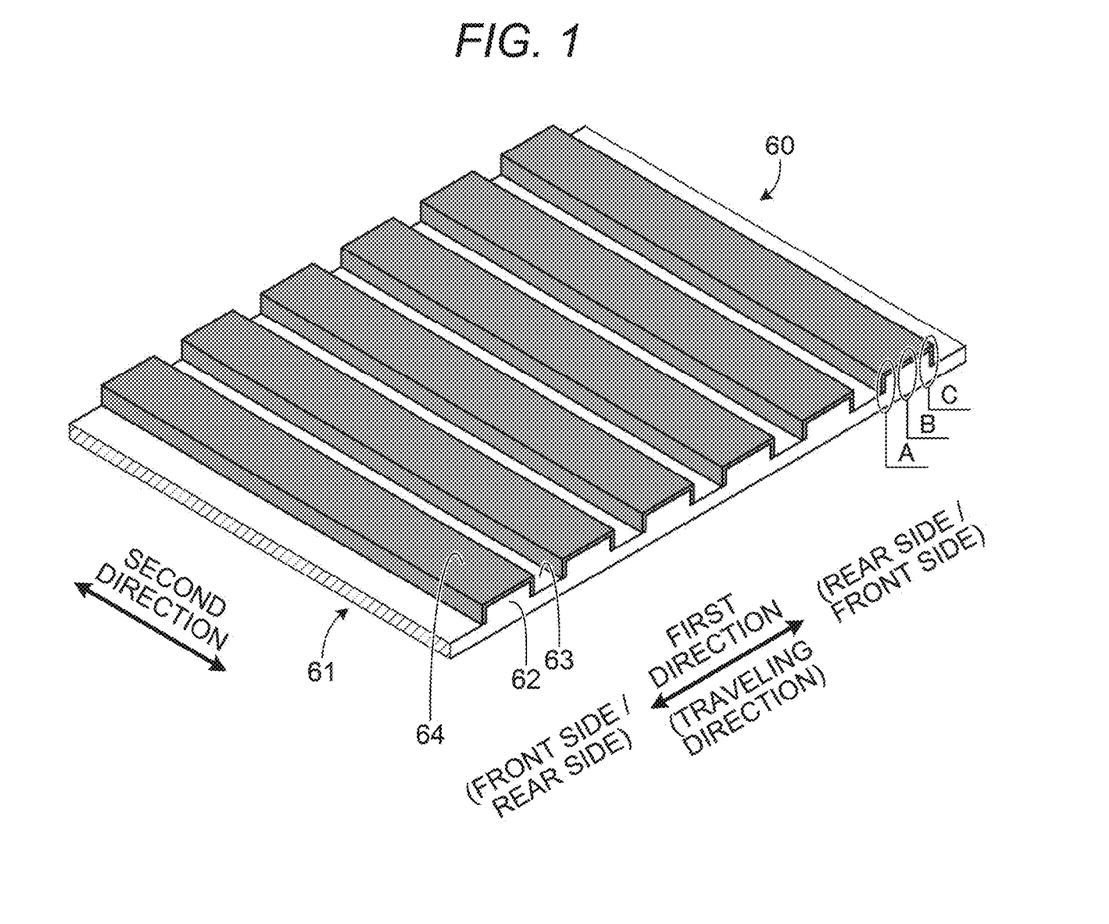
FIG. 1 is a perspective view which schematically shows an example of a schematic configuration of a sheet-shaped material. It corresponds to a sheet-shaped material viewed in each direction from a front side and a rear side in a traveling direction.
Figure 2:
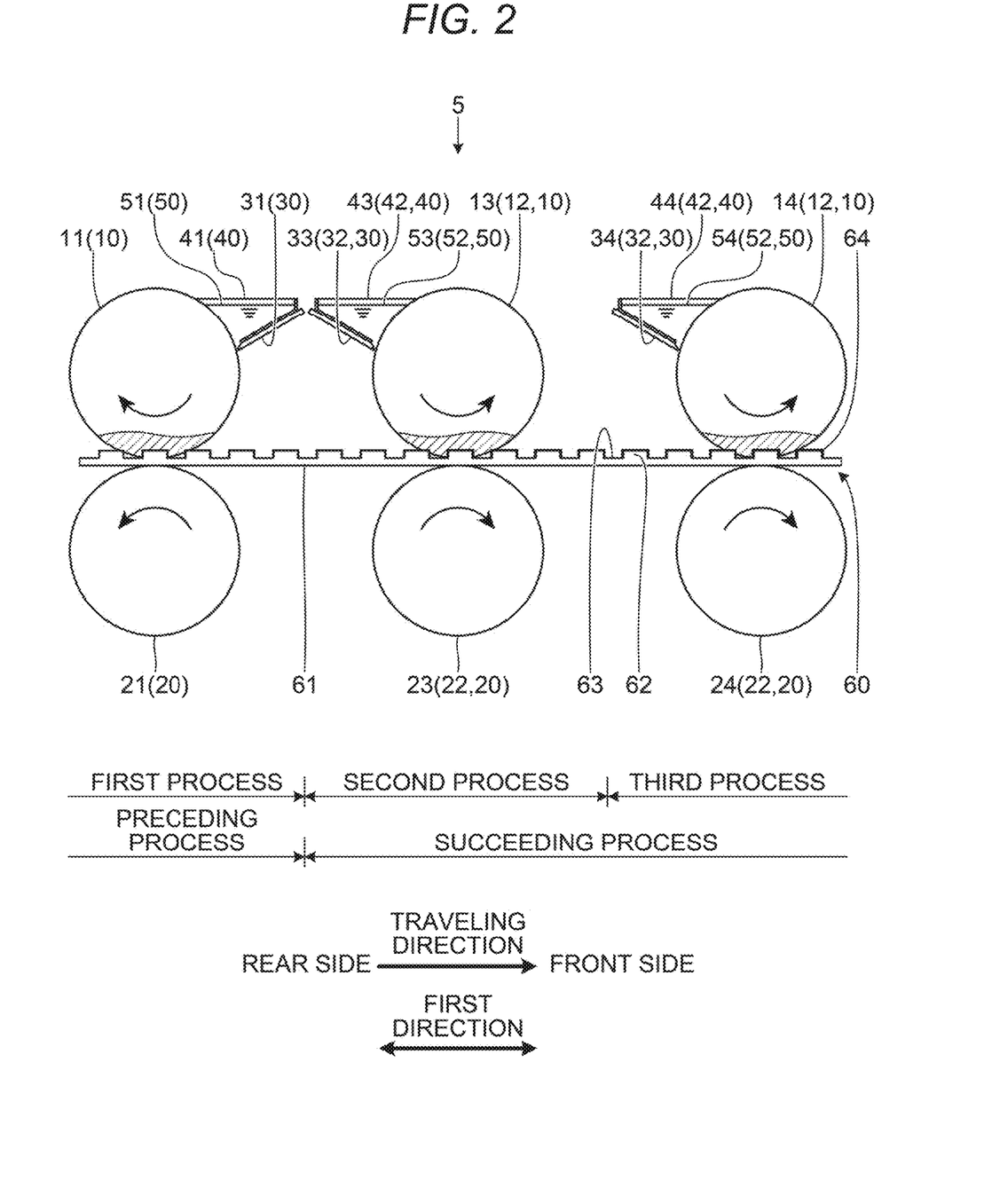
FIG. 2 is a partial cross-sectional side view which schematically shows an example of a schematic configuration of a coating machine. A part of a roll coater, and a tank are shown in cross sections.

The sheet-shaped material 60 is provided with the material to be coated 61 and a coating material 64 (see FIG. 1). The material to be coated 61 is a sheet-shaped member having flexibility. The material to be coated 61 includes a convex portion 62. In the embodiment, the material to be coated 61 is an elongated material including a plurality of convex portions 62. The plurality of convex portions 62 are provided on a front face of the material to be coated 61 in a first direction at a predetermined interval. The first direction coincides with a length direction of the material to be coated 61. Therefore, the sheet-shaped material 60 is a sheet-shaped elongated material having flexibility and includes the plurality of convex portions 62. However, in the material to be coated 61, the number of the convex portion 62 may be one. In this case, the sheet-shaped material 60 also includes one convex portion 62. The sheet-shaped material 60 includes the coating material 64 as the same number of the convex portion 62. The coating material 64 covers only the convex portion 62. The coating material 64 is formed by drying coating liquid 50. The coating material 64 is a coating film or a coating layer. The coating material 64 may be said as a coating film or a coating layer. The coating liquid 50 is applied only to the convex portion 62 by the manufacturing method.

The manufacturing method includes a preceding process and a succeeding process as a coating process (see FIG. 2). The coating process is a process that applies the coating liquid 50 to the material to be coated 61. The succeeding process is carried out after the preceding process. In other words, the preceding process is carried out before the succeeding process. The preceding process may be carried out before the succeeding process. The preceding process may be the first coating process which is carried out in the manufacturing method or may be a coating process which is carried out after a coating process expect the succeeding process in the manufacturing method. The succeeding process may be a single process or may be a multiple process.

In the embodiment, as the coating process carried out in the manufacturing method, a first process, a second process, and a third process are shown as examples. The first process is the preceding process. Therefore, the preceding process means the first process and the first process means the preceding process. The second process and the third process are the succeeding process, and are carried out after the first process. That is, the manufacturing method includes two processes, the second process and the third process, as the succeeding process. The third process is carried out after the second process. In the case in which the second process and the third process are not distinct or are collectively called, they are referred to as "succeeding process". In the case in which the coating liquid 50 used in the preceding process and the coating liquid 50 used in the succeeding process are distinct, the former coating liquid 50 is referred to as "first coating liquid 51" and the latter coating liquid 50 is referred to as "second coating liquid 52". In the case in which the second coating liquid 52 used in the second process and the second coating liquid 52 used in the third process are distinct, the former second liquid 52 is referred to as "third coating liquid 53" and the latter coating liquid 52 is referred to as "fourth coating liquid 54". In the case in which the third coating liquid 53 and the fourth coating liquid 54 are not distinct or are collectively called, they are referred to as "second coating liquid 52". In the case in which the first coating liquid 51, the second coating liquid 52, the third coating liquid 53, and the fourth coating liquid 54 are not distinct or are collectively called, they are referred to as "coating liquid 50".

The coating machine 5 carries out the manufacturing method. The coating machine 5 is provided with a first roll coater 11 and a second roll coater 12. In the embodiment, the coating machine 5 is provided with two second roll coaters 12 which corresponds to the two processes, the second process and the third process. In the two second roll coater 12, the second roll coater 12 which corresponds to the second process is referred to as "third roll coater 13" and the second roll coater 12 which corresponds to the third process is referred to as "fourth roll coater 14". That is, the coating machine 5 is provided with the first roll coater 11, the third roll coater 13, and the fourth roll coater 14. In the embodiment, in the case in which the third roll coater 13 and the fourth roll coater 14 are not distinct or are collectively called, they are referred to as "second roll coater 12". In the case in which the first roll coater 11, the second roll coater 12, the third roll coater 13, and the fourth roll coater 14 are not distinct or are collectively called, they are referred to as "roll coater 10".

In the coating machine 5, the first roll coater 11, the third roll coater 13, and the fourth roll coater 14 are provided in the order of the first roll coater 11, the third roll coater 13, and the fourth roll coater 14 in a traveling direction. The traveling direction is, when the manufacturing method is carried out, a direction in which the material to be coated 61 is conveyed. The traveling direction is a direction along the first direction. That is, the third roll coater 13 and the fourth roll coater 14 are provided at a front side of the traveling direction of the first roll coater 11. The fourth roll coater 14 is provided at a front side of the traveling direction of the third roll coater 13.

The preceding process (first process) is a process to apply the first coating liquid 51 to the material to be coated 61 by the first roll coater 11. Furthermore, the preceding process (first process) is a process to apply the first coating liquid 51 only to the convex portion 62 by using a reverse roll coater as the first roll coater 11. The succeeding process (second process and third process) is a process to apply the second coating liquid 52 to the material to be coated 61 by the second roll coater 12. Furthermore, the succeeding process (second process and third process) is a process to apply the second coating liquid 52 only to the convex portion 62 by the second roll coater 12. That is, the second process is a process to apply the third coating liquid 53 to the material to be coated 61 by the third roll coater 13. Furthermore, the second process is a process to apply the third coating liquid 53 only to the convex portion 62 by the third roll coater 13. The third process is a process to apply the fourth coating liquid 54 to the material to be coated 61 by the fourth roll coater 14. Furthermore, the third process is a process to apply the fourth coating liquid 54 only to the convex portion 62 by the fourth roll coater 14.

The coating machine 5 is further provided with a receiving roll 20, a doctor device 30, and a tank 40. The coating machine 5 is provided with, as same as the three roll coaters 10 that corresponds to the first process, the second process, and the third process, three receiving rolls 20, three doctor devices 30, and three tanks 40.

In the embodiment, the three receiving rolls 20 are referred to as "first receiving roll 21", "third receiving roll 23", and "fourth receiving roll 24". The first receiving roll 21 corresponds to the preceding process, and the third receiving roll 23 and the fourth receiving roll 24 correspond to the succeeding process. In the case in which the third receiving roll 23 and the fourth receiving roll 24 are not distinct or are collectively called, they are referred to as "second receiving roll 22". In the case in which the first receiving roll 21, the second receiving roll 22, the third receiving roll 23, and the fourth receiving roll 24 are not distinct or are collectively called, they are referred to as "receiving roll 20". The three doctor devices 30 are referred to as "first doctor device 31", "third doctor device 33", and "fourth doctor device 34". The first doctor device 31 corresponds to the preceding process and the third doctor device 33 and the fourth doctor device 34 correspond to the succeeding process. In the case in which the third doctor device 33 and the fourth doctor device 34 are not distinct or are collectively called, they are referred to as "second doctor device 32". In the case in which the first doctor device 31, the second doctor device 32, the third doctor device 33, and the fourth doctor device 34 are not distinct or are collectively called, they are referred to as "doctor device 30". The three tanks 40 are referred to as "first tank 41", "third tank 43", and "fourth tank 44". The first tank 41 corresponds to the preceding process, and the third tank 43 and the fourth tank 44 correspond to the succeeding process. In the case in which the third tank 43 and the fourth tank 44 are not distinct or collectively called, they are referred to as "second tank 42". In the case in which the first tank 41, the second tank 42, the third tank 43, and the fourth tank 44 are not distinct or are collectively called, they are referred to as "tank 40".

The first receiving roll 21 is provided at a position facing the first roll coater 11 with the material to be coated 61 in between. The second receiving roll 22 is provided at a position facing the second roll coater 12 with the material to be coated 61 in between. That is, the third receiving roll 23 is provided at a position facing the third roll coater 13 with the material to be coated 61 in between. The fourth receiving roll 24 is provided at a position facing the fourth roll coater 14 with the material to be coated 61 in between. By providing the receiving roll 20 to face the roll coater 10, the following effect can be obtained. That is, even in the case in which the material to be coated 61 has a high stretchability, the coating liquid 50 can be applied to the desired position.

The material forming the receiving roll 20 is not particularly limited. For example, the receiving roll 20 is formed of a known material. Examples of the material previously described include metal, rubber and plastic. However, the inventor considers that rubber is preferable from the viewpoint of clearance adjustment. The clearance is the interval between the roll coater 10 and the receiving roll 20 that are arranged to face each other. An outer peripheral surface of the receiving roll 20 may be a smooth surface without unevenness. The hardness of the outer peripheral surface of the receiving roll 20 is not particularly limited. However, the hardness of the outer peripheral surface of the receiving roll 20 is better to be set to 30 to 70 in terms of A hardness from the viewpoint of clearance adjustment. The clearance is as previously described. The A hardness conforms to JIS K6253-3 (vulcanized rubber and thermoplastic rubber— how to determine hardness—part 3: durometer hardness), and is measured by using a Type A durometer. An example of the Type A durometer is "Asker rubber hardness meter A type" manufactured by KOBUNSHI KEIKI CO., LTD.

Providing the coating liquid 50 to the roll coater 10 may be carried out through the doctor device 30. In the coating machine 5, the coating liquid 50 is provided to the roll coater 10 through the doctor device 30. By the doctor device 30, an appropriate amount of the coating liquid 50 can be provided to the roll coater 10. The first doctor device 31 adjusts the amount of the first coating liquid 51 which is provided to the first roll coater 11. The second doctor device 32 adjusts the amount of the second coating liquid 52 which is provided to the second roll coater 12. That is, the third doctor device 33 adjusts the amount of the third coating liquid 53 which is provided to the third roll coater 13. The fourth doctor device 34 adjusts the amount of the fourth coating liquid 54 which is provided to the fourth roll coater 14. An example of the doctor device 30 is a doctor blade. The inventor considers that employing the doctor blade as the doctor device 30 is preferable from the following viewpoints. The previously described viewpoints are points regarding the ease of implementation to the roll coater 10 and the workability. In the embodiment, the coating machine 5 is provided with the doctor blade as the doctor device 30.

In the case in which the doctor device 30 is a doctor blade, the material forming the doctor blade is not particularly limited. For example, the doctor blade is formed of a known material. Examples of the material previously described include metal, rubber and plastic. However, the inventor considers that metal is preferable from the viewpoint of durability and accuracy of the doctor blade. A thickness of a tip end of the doctor blade is better to be set to 0.1 to 1.0 mm. The tip end of the doctor blade is an end portion of the doctor blade on the roll coater 10 side. The tip end of the doctor blade contacts the outer peripheral surface of the roll coater 10. By setting the thickness of the tip end of the doctor blade to 0.1 mm or more, it is possible to prevent the doctor blade from being bent in the following state. The previously described state is a state in which the doctor blade contacts the outer peripheral surface of the roll coater 10 with the tip end. By setting the thickness of the tip end of the doctor blade to 1.0 mm or less, it is possible to prevent the doctor blade from becoming hard. Therefore, the coating liquid 50 can be scraped off along the outer peripheral surface of the roll coater 10 by the doctor blade.

The first tank 41 stores the first coating liquid 51. The first coating liquid 51 is provided from the first tank 41 to the first roll coater 11 through the first doctor device 31. The second tank 42 stores the second coating liquid 52. The second coating liquid 52 is provided from the second tank 42 to the second roll coater 12 through the second doctor device 32. That is, the third tank 43 stores the third coating liquid 53.

The third coating liquid 53 is provided from the third tank 43 to the third roll coater 13 through the third doctor device 33. The fourth tank 44 stores the fourth coating liquid 54. The fourth coating liquid 54 is provided from the fourth tank 44 to the fourth roll coater 14 through the fourth doctor device 34.

Other than this, the coating machine 5 has a structure which is included in a known coating machine. For example, the coating machine 5 includes a feed roll and a temperature adjuster. However, in the embodiment, description and illustration of the following structures will be omitted. The previously described structures are structures which are the same as those of a known coating machines such as a feed roll and a temperature adjuster.

The first roll coater 11 is a reverse roll coater. The reverse roll coater is a roll coater whose rotation direction is the following direction. The previously described direction is a direction corresponding to the direction opposite to the traveling direction. For example, based on the coating machine 5 of FIG. 1, the traveling direction is a direction from the left side to the right side of the paper surface in the state in which FIG. 1 is viewed straight. Therefore, the direction (rotation direction) corresponding to the traveling direction is counterclockwise. In this case, the direction opposite to the traveling direction is a direction from the right side to the left side of the paper surface in the previously described state, and the direction (rotation direction) corresponding to the direction opposite to the traveling direction is clockwise. That is, in the coating machine 5, the first roll coater 11, which is a reverse roll coater, rotates clockwise. In FIG. 1, arc-shaped arrows shown inside the roll coater 10 and the receiving roll 20 indicate the rotation directions of the previously described respective parts.

The material forming the first roll coater 11 is not particularly limited. For example, the first roll coater 11 is formed of a known material. Examples of the material previously described include metal, rubber and plastic. However, the inventor considers that metal is preferable from the viewpoint of durability and long-term availability.

The first roll coater 11 has a groove on the surface. The groove holds the first coating liquid 51. A shape of the groove is not particularly limited. Examples of the shape of the groove include an inverted pyramid shape and a slit shape. A depth of the groove is better to be set to, for example, 100 to 300 μm. The shape or depth of the groove is appropriately set in consideration of various points. For example, the shape or depth of the groove is better to be set in accordance with the viscosity of the first coating liquid 51. Further, the shape or depth of the groove is better to be set in accordance with the wet coating amount of the first coating liquid 51.

The second roll coater 12 is better to include a direct roll coater. That is, the third roll coater 13 may be a direct roll coater, or the fourth roll coater 14 may be a direct roll coater. In the coating machine 5, the direct roll coaters are employed as the third roll coater 13 and the fourth roll coater 14. The direct roll coater is a roll coater whose rotation direction is the following direction. The previously described direction is the direction corresponding to the traveling direction. The direction corresponding to the traveling direction is as described above. That is, in the coating machine 5, the third roll coater 13 and the fourth roll coater 14, which are direct roll coaters, rotate counterclockwise.

As the first roll coater 11, the material of the second roll coater 12 is not particularly limited. For example, the second roll coater 12 is formed of the same material as the first roll coater 11. The second roll coater 12 has a groove on the surface. The groove holds the second coating liquid 52. As the first roll coater 11, the shape and depth of the groove are appropriately set in consideration of various points. For example, the shape and depth of the groove is better to be set in accordance with the viscosity of the second coating liquid 52. Further, the shape and depth of the groove is better to be set in accordance with the wet coating amount of the second coating liquid 52.

The succeeding process is better to include a process to apply the second coating liquid 52 by wet-on-wet. That is, one or both of the second process and the third process is better to be a process to apply the second coating liquid 52 by wet-on-wet. The wet-on-wet is a coating method in which, before the coating liquid 50 applied during the performed coating process is dried, the coating liquid 50 is applied to the same target in the next coating process. It can be said that the previously described "before the coating liquid 50 is dried" is a state in which the coating liquid 50 is in a moistening state. In the embodiment, the coating methods of the second process and the third process are wet-on-wet. However, in one or both of the second process and the third process, the coating method may not be wet-on-wet. The coating method in the second process and the third process is appropriately set in consideration of various conditions.

A clearance between a pair of the roll coater 10 and the receiving roll 20 is appropriately set according to the thickness of the material to be coated 61. In the coating machine 5, the following first clearance, second clearance, and third clearance may have the same value or different values. The first clearance is a clearance between the first roll coater 11 and the first receiving roll 21. The second clearance is a clearance between the third roll coater 13 and the third receiving roll 23. The third clearance is a clearance between the fourth roll coater 14 and the fourth receiving roll 24. However, the inventor considers that the previously described three clearances preferably have the same value from the following viewpoint. The previously described viewpoint is a point that the first coating liquid 51, the third coating liquid 53, and the fourth coating liquid 54 are uniformly applied only on the convex portions 62.

The wet coating amount of the coating liquid 50 is not particularly limited. The wet coating amount of the coating liquid 50 is appropriately set in consideration of various points. However, in the plurality of coating processes of the manufacturing method, the wet coating amount of the coating liquid 50 is better to be equal in mass ratio from the following viewpoint. The previously described viewpoint is a point in which uneven coating on the sheet-shaped material 60 can be improved. For example, in the first process, the second process, and the third process of the manufacturing method, the mass ratio of the wet coating amounts of the first coating liquid 51, the third coating liquid 53, and the fourth coating liquid 54 is better to be "first coating liquid 51:third coating liquid 53:fourth coating liquid 54=1:1:1". The wet coating amount of the coating liquid 50 applied to the material to be coated 61 (the plurality of convex portions 62) in the entire manufacturing method is better to be 40 g/m² or more from the following viewpoint. The previously described viewpoint is a point in which uneven coating on the sheet-shaped material 60 is improved.

The coating liquid 50 is not particularly limited. The coating liquid 50 is appropriately selected in consideration of various points. For example, the coating liquid 50 may be a solution which contains resin. The coating liquid 50 may be a solution which contains colorant. The coating liquid 50 may be a solution which contains functional agent. The first coating liquid 51 and the second coating liquid 52 may be the same coating liquid 50 or different coating liquids 50. The third coating liquid 53 and the fourth coating liquid 54 may be the same second coating liquid 52 or different second coating liquids 52. In this case, one or all of the first coating liquid 51, the third coating liquid 53, and the fourth coating liquid 54 may be the same coating liquid 50 or different coating liquids 50.

A viscosity of the coating liquid 50 is preferably set to 100 to 20000 mPa·s from the viewpoint of coating properties. The viscosity of the coating liquid 50 can be measured by using a BM type viscosity meter. At the time of measurement, the temperature of the coating liquid 50 is set to 35±5° C. As the BM type viscosity meter, for example, a measuring machine manufactured by TOKI SANGYO CO., LTD. can be used, and a rotor of rotor No. 4 can be used. By setting the viscosity of the coating liquid 50 to 100 mPa·s or more, the coating liquid 50 easily stays at a predetermined position, and uneven coating can be prevented. By setting the viscosity of the coating liquid 50 to 20000 mPa·s or less, foaming of the coating liquid 50 can be suppressed. Accordingly, it is possible to prevent the coating properties from being impaired. Preferably, the viscosity of the coating liquid 50 is better to be set to 300 to 5000 mPa·s from the viewpoint of coating properties. In the case in which the doctor device 30 is a doctor blade, by setting the viscosity of the coating liquid 50 to 300 mPa·s or more, it is possible to prevent the coating liquid 50 from leaking from the doctor blade. By setting the viscosity of the coating liquid 50 to be 5000 mPa·s or less, it is possible to prevent the viscosity of the coating liquid 50 from increasing and the coating properties from decreasing with the lapse of time. Therefore, it is possible to prevent continuous workability from being impaired.

The material to be coated 61 is not particularly limited. Examples of the material to be coated 61 include the following known sheet-shaped members having the convex portion 62. Examples of the previously described member include woven fabric, knitted fabric, non-woven fabric, natural leather, artificial leather, synthetic leather, vinyl chloride leather, and resin sheet. Natural leather includes split leather. The material forming the material to be coated 61 is not particularly limited. The material to be coated 61 is formed of a known material.

A method for forming the convex portion 62 on the material to be coated 61 is not particularly limited. For example, the convex portion 62 is formed by the fineness of the yarn, the woven structure or the knitted structure. Further, the convex portion 62 is formed by the following pressed process. Examples of the previously described pressed process include embossing, welder and pinsonic.

A shape of the convex portion 62 is not particularly limited. The shape of the convex portion 62 can be any shape. For example, the convex portion 62 may be stripes, borders, or checkered patterns. Further, the convex portion 62 may be a geometrical pattern of a triangle, a quadrangle, or a pentagon or more polygons, or may be a geometrical pattern of a triangular pyramid, a quadrangular pyramid, or a polygonal pyramid having five or more pyramids. Furthermore, the convex portion 62 may have a frustum-shaped or roof-shaped pattern. A shape of a top surface of the convex portion 62 is not particularly limited. For example, the top surface of the convex portion 62 may be a curved surface, a flat surface, or an inclined surface. A shape of a side surface of the convex portion 62 is not particularly limited. The side surface of the convex portion 62 may be perpendicular to the top surface of the convex portion 62, or may be inclined with respect to the top surface of the convex part 62. Furthermore, the side surface of the convex portion 62 may be step-shaped. In the case in which the material to be coated 61 includes a plurality of convex portions 62, an interval at which the convex portions 62 are adjacent to each other is not particularly limited. The shape of the convex portion 62 is appropriately set in accordance with the design properties required for the sheet-shaped material 60.

A height of the convex portion 62 is better to be set to 0.5 to 10 mm. Preferably, the height of the convex portion 62 is set to 0.5 to 3 mm. By setting the height of the convex portion 62 to be 0.5 mm or more, it is possible to prevent the coating liquid 50 from being applied to a portion other than the convex portion 62 of the material to be coated 61 when the manufacturing method is performed. By setting the height of the convex portion 62 to be 10 mm or less, the coating liquid 50 can be applied to the side surface of the convex portion 62. For example, the coating liquid 50 can be applied to the following side surface of the convex portion 62. The previously described side surfaces are a side surface of a front side in the traveling direction of the convex portion 62 and a side surface of a rear side in the traveling direction of the convex portion 62.

After completion of the manufacturing method, the sheet-shaped material 60 may be heat-treated. In this case, the sheet-shaped material 60 becomes a finished product through the manufacturing method and the heat treatment. One or both of the manufacturing method and the heat treatment may be repeated. The sheet-shaped material 60 has no uneven coating and only the convex portions 62 are uniformly covered by the coating material 64 (see FIG. 1).

Effect of Embodiment

According to the embodiment, the following effects can be obtained.

(1) The manufacturing method includes the preceding process (first process) and the succeeding process (second process and third process) (see FIG. 2). In the preceding process, the first coating liquid 51 is applied to the material to be coated 61 by the first roll coater 11. The succeeding process is performed after the preceding process. In the succeeding process, the second coating liquid 52 is applied to the material to be coated 61 by the second roll coater 12. That is, in the second process, the third coating liquid 53 is applied to the material to be coated 61 by the third roll coater 13. Thereafter, in the third process, the fourth coating liquid 54 is applied to the material to be coated 61 by the fourth roll coater 14. In the preceding process, the reverse roll coater is used as the first roll coater 11, and the first coating liquid 51 is applied only to the convex portion 62. In the succeeding process, the second coating liquid 52 is applied only to the convex portion 62 by the second roll coater 12. That is, in the second process, the third coating liquid 53 is applied only to the convex portion 62 by the third roll coater 13. Thereafter, in the third process, the fourth coating liquid 54 is applied only to the convex portion 62 by the fourth roll coater 14.

Thus, in the manufacturing method, tension against the material to be coated 61 can be easily adjusted. Therefore, between the first roll coater 11 and the second roll coater 12, it is possible to suppress the generation of wrinkles on the material to be coated 61. The coating liquid 50 can be applied only to the convex portion 62. Furthermore, the coating liquid 50 can be applied to a desired position on the convex portion 62. The coating liquid 50 can be uniformly applied only to the convex portion 62 without causing uneven coating. It is possible to form the sheet-shaped material 60 whose convex portion 62 is only covered by the coating material 64 uniformly.

(2) In the manufacturing method, the succeeding process includes a process of applying the second coating liquid 52 only to the convex portion 62 by using a direct roll coater as the second roll coater 12. That is, in the second process, the third coating liquid 53 is applied only to the convex portion 62 by using a direct roll coater as the third roll coater 13. In the third process, the fourth coating liquid 54 is applied only to the convex portion 62 by using a direct roll coater as the fourth roll coater 14.

Thus, it is possible to eliminate unpainted portions at the following boundary portions. The previously described boundary portions are portions of the material to be coated 61 which are boundaries between the convex portion 62 and a bottom surface of a concave portion 63 on the front side and the rear side in the traveling direction of the convex portion 62. The sheet-shaped material 60 in the following state can be manufactured. The previously described state is a state in which the following surfaces of the convex portion 62 are covered by the coating material 64 uniformly. The previously described surfaces are the side surface on the front side in the traveling direction of the convex portion 62, the top surface of the convex portion 62, and the side surface on the rear side in the traveling direction of the convex portion 62. For example, in the first process, it is assumed that an unpainted portion is left on any portion of the previously described surfaces of the convex portion 62. Even in such case, the second coating liquid 52 can be uniformly applied to the previously described surfaces of the convex portion 62 by the succeeding process which uses the direct roll coater.

In the manufacturing method, the coating liquid 50 can also be prevented from being applied to the side surface of the convex portion 62 in a second direction. The second direction is a direction orthogonal to the first direction and the traveling direction. In this case, in the sheet-shaped material 60, the side surface of the convex portion 62 in the second direction is not covered by the coating material 64 (see FIG. 1).

(3) In the manufacturing method, the succeeding process includes a process of applying the second coating liquid 52 only on the convex portion 62 by wet-on-wet. Thus, the first coating liquid 51 and the second coating liquid 52 can be made compatible with each other. For example, it is assumed that the second process is a process of applying the third coating liquid 53 by wet-on-wet only to the convex portion 62 before the first coating liquid 51 is dried. In this case, the first coating liquid 51 and the third coating liquid 53 can be made compatible with each other. Assuming that the third process is a process of applying the fourth coating liquid 54 by wet-on-wet only to the convex portion 62 before the third coating liquid 53 is dried, or before the first coating liquid 51 and the third coating liquid 53 are dried. In this case, the third coating liquid 53 and the fourth coating liquid 54 can be made compatible, or the first coating liquid 51 and the third coating liquid 53 can be made compatible with the fourth coating liquid 54. Furthermore, by making the succeeding process wet-on-wet, the wet coating amount of the second coating liquid 52 can be easily adjusted. The coating liquid 50 can be uniformly applied only to the convex portion 62 without causing uneven coating of the coating liquid 50 on the convex portion 62. In the sheet-shaped material 60, uneven coating is improved. It is possible to make the sheet-shaped material 60 whose convex portion 62 is only covered by the coating material 64 uniformly.

<Modifications>

The embodiment can also be configured as follows. Some configurations of modifications illustrated below may also be employed in combination as appropriate. In the following description, points different from the above description are described, and the description of similar points is omitted as appropriate.

(1) In the manufacturing method, the second process and the third process are performed as the succeeding process (see FIG. 2). The coating machine 5 is provided with the third roll coater 13 and the fourth roll coater 14. The second process is performed by using the third roll coater 13. The third process is performed by using the fourth roll coater 14. The coating machine 5 employs a direct roll coater as the third roll coater 13 and the fourth roll coater 14.

In the coating machine 5, the second roll coater 12 may be a direct roll coater or a reverse roll coater. Assuming that the second roll coater 12 is a direct roll coater. In this case, the second coating liquid 52 can be applied from the direction opposite to that in the first process. The second coating liquid 52 can be applied to the following side surface of the convex portion 62. The previously described side surface is a side surface of the convex portion 62 on the rear side in the traveling direction. Assuming that the second roll coater 12 is a reverse roll coater. In this case, the second coating liquid 52 can be applied from the same direction as the first process. A large amount of the second coating liquid 52 can be applied to the following side surface of the convex portion 62. The previously described side surface is a side surface of the convex portion 62 on the front side in the traveling direction.

Assuming that the succeeding process includes a plurality of processes. In this case, a direct roll coater may be employed as the second roll coater 12 in some processes of the succeeding process, and a reverse roll coater may be employed as the second roll coater 12 in other processes of the succeeding process. For example, one of the third roll coater 13 and the fourth roll coater 14 may be a reverse roll coater.

(2) The manufacturing method includes an aspect in which the preceding process is performed after the coating process excluding the succeeding process. In this case, the preceding process may be a process of applying the first coating liquid 51 by wet-on-wet. In this case, in the preceding process, the first coating liquid 51 is applied to this convex portion 62 before the following coating liquid is dried. The previously described coating liquid is a coating liquid applied to the convex portion 62 in the coating process performed before performing the preceding process. The previously described coating liquid and the first coating liquid 51 can be made compatible with each other.

(3) The coating machine 5 is provided with the receiving roll 20 (see FIG. 2). The receiving roll 20 may be omitted. For example, when the material to be coated 61 is a material to be coated having low stretchability, the receiving roll 20 may be omitted.

Example

The evaluation results of the sheet-shaped material will be described. In this description, the evaluation targets are referred to as "Example 1" and "Comparative Example 1". Example 1 targets the following sheet-shape material. The previously described sheet-shaped material is a sheet-shaped material manufactured by a manufacturing method corresponding to the manufacturing method of the embodiment, and corresponds to the sheet-shaped material 60. The manufacturing method of Example 1 includes the first process as the preceding process and the second process as the succeeding process. The third process was omitted. Comparative Example 1 targets the following sheet-shaped material. The previously described sheet-shaped material is a sheet-shaped material manufactured by a manufacturing method different from the manufacturing method of the embodiment, and is different from the sheet-shaped material 60. The manufacturing method of Comparative Example 1 includes a process corresponding to the first process exemplified as the preceding process, and does not include a process corresponding to the succeeding process.

The reference numerals in ( ) for the respective parts of the coating machine in the following description are for convenience of description indicating the corresponding relationship with the respective parts of the coating machine 5 of the above-described embodiment. For example, the first roll coater (11) indicates that this first roll coater corresponds to the first roll coater 11 of the above-described embodiment. However, the present invention is not limited to Example 1.

<Observation of Cross Section of Convex Portion>

The evaluation of the sheet-shaped material in Example 1 and Comparative Example 1 were performed by observing the cross sections of the convex portions included in the previously described sheet-shaped material. A scanning electron microscope (model: S-3000N, manufactured by HITACHI HIGH-TECHNOLOGIES CORPORATION) was used for the observation. The observation magnification was 50 times. The observation positions were set to edge A, center B, and edge C. In FIG. 1, the area of code A corresponds to edge A, the area of code B corresponds to center B, and the area of code C corresponds to edge C. That is, edge A is the boundary area of the convex portion on one side in the traveling direction. Center B is the central region of the convex portion. Edge C is the boundary area of the convex portion on the other side in the traveling direction. As a criterion for judgment, a state in which the coating material adhered to any of the points, edge A, center B, and edge C, was regarded as acceptable.

Example 1

(1) Material to be Coated

The material to be coated was a sheet-shaped flexible member having convex portions formed by embossing a woven fabric. The specifications of the woven fabric are as follows. The convex portions had a height of 1 mm, a width of 1550 mm, and a length of 15 mm. The intervals between the convex portions were 5 mm. The width dimension of the convex portion corresponds to the dimension in the second direction described above, and the length dimension and the interval of the convex portion correspond to the dimension in the first direction described above (see FIG. 1).

[Woven Specifications]
Warp: 167 dtex/48f Polyester multifilament processed yarn, 180 pieces/25.4 mm
Weft: 167 dtex/36f Polyester multifilament processed yarn, 90 pieces/25.4 mm (2) Coating Liquid The coating liquid was a solution in which a urethane resin (product name: ADEKA BONTITER HUX-564, manufactured by ADEKA CORPORATION, solid content 40 mass %) was adjusted to a viscosity of 1000 mPa·s with water. The coating liquid was only this type of solution.

(3) Coating Machine and Manufacturing Method

The coating machine of Example 1 is provided with the first roll coater (11), the first receiving roll (21), the first doctor device (31), the first tank (41), the third roll coater (13), the third receiving roll (23), the third doctor device (33), and the third tank (43). The above-mentioned coating liquid was stored in the first tank (41) and the third tank (43). Specifications of the first roll coater (11), the first receiving roll (21), the first doctor device (31), the third roll coater (13), the third receiving roll (23), and the third doctor device (33) are as follows.

[First Roll Coater (11)]
Type, material, mesh size, groove shape, groove depth: Reverse roll coater, metal, 30, inverted pyramid shape, 100 μm

[First Receiving Roll (21)]
Material, outer peripheral surface: Metal, smooth surface

[First Doctor Device (31)]
Type, material, tip end thickness: Doctor blade, metal, 0.5 mm

[Third Roll Coater (13)]
Type, material, mesh size, groove shape, groove depth: Direct roll coater, metal, 30, inverted pyramid shape, 100 μm

[Third Doctor Device (33)]
Type, material, tip end thickness: Doctor blade, metal, 0.5 mm In the coating machine of Example 1, the first clearance and the second clearance were set to 0.6 mm. As in the case of the above-described embodiment, the first clearance is a clearance between the first roll coater (11) and the first receiving roll (21), and the second clearance is a clearance between the third roll coater (13) and the third receiving roll (23).

In the manufacturing method of Example 1, the material to be coated was placed at the following position. The previously described position is a position in which the convex portion is in contact with the first roll coater (11) and the third roll coater (13). A conveying speed of the material to be coated was 10 m/min. In the first process and the second process of the manufacturing method of Example 1, the wet coating amount of the coating liquid was set to 150 g/m$^2$. Therefore, in the first process and the second process of the manufacturing method of Example 1, the mass ratio of the wet coating amount of the coating liquid is "coating liquid of the first process:coating liquid of the second process=1:1". Furthermore, after completion of the manufacturing method, the manufactured sheet-shaped material was heat-treated with a heat setter. The heat treatment condition was at a temperature of 150° C. for 90 seconds. In Example 1, the sheet-shaped material after the heat treatment was the evaluation target.

(4) Evaluation Results

Figure 3:
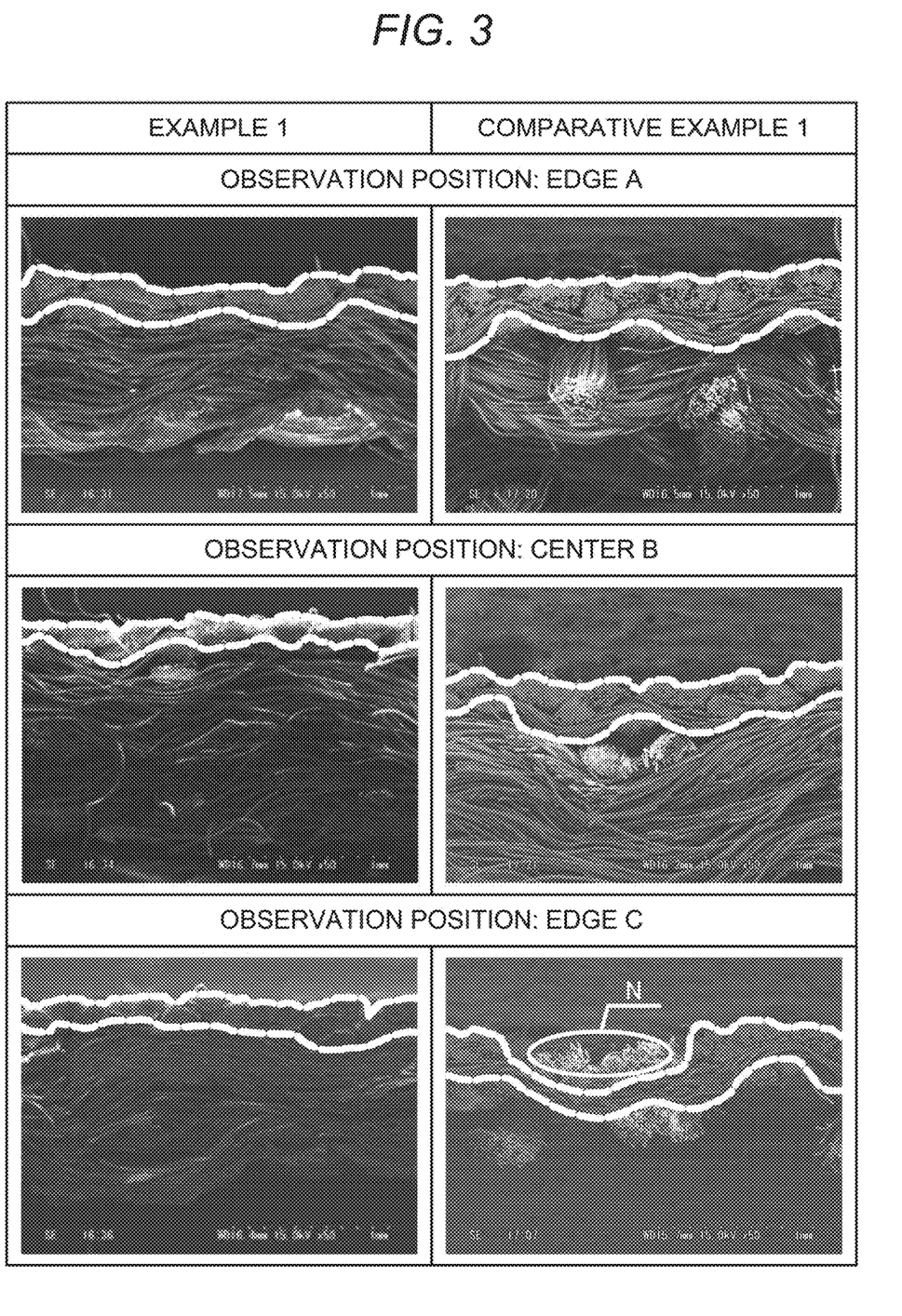
FIG. 3 are diagrams showing evaluation results. Photographs of cross sections of convex portions of the sheet-shaped material by a scanning electron microscope are shown.

In Example 1, no wrinkles were observed on the material to be coated when the manufacturing method was performed. In the sheet-shaped material of Example 1, the coating liquid was applied to the convex portions. Furthermore, in this sheet-shaped material, the coating material adhered to edge A, center B, and edge C of the convex portion, and edge A, center B, and edge C of the convex portion were all covered by the coating material (see the upper row, the middle row, and the lower row on the left side in FIG. 3). As a result, the sheet-shaped material of Example 1 was an acceptable product that satisfies the above-described judgement criterion. The upper and lower two broken lines shown in the six photographs in FIG. 3 are illustrated for convenience to clearly show the area covered by the coating material.

Comparative Example 1

(1) Material to be Coated, Adjustment of Coating Liquid, Coating Machine and Manufacturing Method In Comparative Example 1, the material to be coated and the coating liquid are the same as in Example 1. The different point between Comparative Example 1 and Example 1 is that the manufacturing method of Comparative Example 1 does not include the succeeding process. The coating machine of Comparative Example 1 is provided with the first roll coater (11), the first receiving roll (21), the first doctor device (31), and the first tank (41). On the other hand, the coating machine of Comparative Example 1 is not provided with the third roll coater (13), the third receiving roll (23), the third doctor device (33), and the third tank (43). In the manufacturing method of Comparative Example 1, only the process corresponding to the first process exemplified as the preceding process is performed in the same manner as in the case of Example 1. Also, in Comparative Example 1, as in Example 1, after completion of the manufacturing method, the manufactured sheet-shaped material was heat-treated with the heat setter. Regarding the material to be coated, adjustment of the coating liquid, the coating machine and the manufacturing method of Comparative Example 1, other explanations are the same as those described above in connection with Example 1, and will be omitted.

(2) Evaluation Results

In Comparative Example 1, no wrinkles were observed on the material to be coated when the manufacturing method was performed. In the sheet-shaped material of Comparative Example 1, the coating liquid was applied to the convex portions. Furthermore, in this sheet-shaped material, the coating material adhered to edge A, and center B of the convex portion, and edge A, and center B of the convex portion were covered by the coating material (see the upper row and the middle row on the right side in FIG. 3). However, in this sheet-shaped material, generation of a region N of the following aspect was observed at edge C of the convex portion (see the lower row on the right side in FIG. 3). The previously described aspect is an aspect including a portion to which the coating material is not adhered and which is not covered by the coating material. As a result, the sheet-shaped material of Comparative Example 1 is a rejected product that does not satisfy the above-described judgement criterion. The ellipse shown in the photograph of edge C in Comparative Example 1 in the lower row on the right side in FIG. 3 is illustrated for convenience to clearly show the region N.

DESCRIPTION OF REFERENCE SIGNS

- 5 Coating machine
- 10 Roll coater
- 11 First roll coater
- 12 Second roll coater
- 13 Third roll coater
- 14 Fourth roll coater
- 20 Receiving roll
- 21 First receiving roll
- 22 Second receiving roll
- 23 Third receiving roll
- 24 Fourth receiving roll
- 30 Doctor device
- 31 First doctor device
- 32 Second doctor device
- 33 Third doctor device
- 34 Fourth doctor device
- 40 Tank
- 41 First tank
- 42 Second tank
- 43 Third tank
- 44 Fourth tank
- 50 Coating liquid
- 51 First coating liquid
- 52 Second coating liquid
- 53 Third coating liquid
- 54 Fourth coating liquid
- 60 Sheet-shaped material
- 61 Material to be coated
- 62 Convex portion
- 63 Concave portion
- 64 Coating material

The invention claimed is:

1. A sheet-shaped material comprising:
a material to be coated having flexibility, the material including a convex portion and a base portion, the convex portion including a side surface and a top surface, and the base portion including a bottom surface abutting the side surface; and
a coating material disposed on the convex portion,
wherein the coating material is disposed on an entirety of the side surface and is absent from the bottom surface.

\* \* \* \* \*